United States Patent [19]

Jackson

[11] 3,868,358

[45] *Feb. 25, 1975

[54] PROTAMINE-INSULIN PRODUCT

[75] Inventor: Richard L. Jackson, Indianapolis, Ind.

[73] Assignee: Eli Lilly and Company, Indianapolis, Ind.

[ * ] Notice: The portion of the term of this patent subsequent to Sept. 11, 1990, has been disclaimed.

[22] Filed: Mar. 2, 1973

[21] Appl. No.: 337,511

Related U.S. Application Data

[62] Division of Ser. No. 139,120, April 30, 1971, Pat. No. 3,758,683.

[52] U.S. Cl. .............................. 260/112.7, 424/178
[51] Int. Cl... C07c 103/52, C07g 7/00, A61k 17/02
[58] Field of Search .................................. 260/112.7

[56] References Cited
UNITED STATES PATENTS
2,694,666   11/1954   Parfentjev ........................ 260/112.7
2,801,953   8/1957   Dorzbach et al. ............... 260/112.7

*Primary Examiner*—Lewis Gotts
*Assistant Examiner*—Reginald J. Suyat
*Attorney, Agent, or Firm*—William E. Maycock; Everet F. Smith

[57] ABSTRACT

The invention relates to a combination of protamine with an insulin salt. The insulin salt is derived by crystallization of insulin in the presence of ions of an alkali metal or metalloid such as sodium, potassium, lithium, cesium or ammonium at an alkaline pH range. The protamine is present in an amount from about 0.2 to about 1.5 mg. of protamine for each 100 units of insulin. The insulin salt and protamine form an insoluble complex at a pH from 6.5 to 8 in an aqueous medium, which complex when dried is easily reconstituted without activity loss.

2 Claims, 5 Drawing Figures

PROTAMINE-INSULIN PRODUCT

This is a division of application Ser. No. 139,120 filed Apr. 30, 1971, now U.S. Pat. No. 3,758,683.

BACKGROUND OF THE INVENTION

Present insulin preparations are usually categorized as short, intermediate, or prolonged-acting with respect to their biological activity. In many cases of diabetes, a desirable preparation for therapeutic use is one with a rapid onset of action and a prolonged duration of action. Such dual action for effective control of hyperglycemia using a single injection, has not been demonstrated by any one insulin composition available commercially.

It is an object of the present invention to provide a single injection insulin composition which upon use yields a rapid onset of action and a prolonged duration of action.

It is another object of the present invention to provide an insulin composition which may be stored for long periods of time without substantial deterioration.

Even though in recent years a pre-mixed insulin preparation having both the desired short and intermediate hypoglycemic activities has been introduced into the market, the preparation still requires storage specifications and preservation, thereby rendering it in need of improvement. The pre-mixed composition is composed of a solution of zinc insulin crystals derived from pork pancreas and a suspension of beef high-zinc insulin crystals. Other early preparations in which solutions of zinc insulin crystals or amorphous insulin were mixed with protamine-zinc-insulin or protamine-insulin preparations encountered stability problems due to degradation of protamine and also precipitation of the soluble insulin component by excess protamine present in the mixture. Many problems, such as low purity, instability, color, contamination with the hyperglycemic factor (glucagon), and high molecular weight antigenic proteins associated with commercial zinc insulin crystals, have prevented the development of compositions having both rapid onset and long lasting hypoglycemic action.

SUMMARY OF THE INVENTION

This invention relates to insulin preparations comprising an insulin salt and protamine.

The present invention provides a method for preparing a composition and the resulting composition, the latter comprising an insulin salt and protamine in proportions such that for each 100 units of insulin, there are present from about 0.2 to about 1.5 mg. of protamine. The insulin salt is the sodium salt, or other alkali metal salt, or ammonium salt. The protamine is preferably protamine sulfate.

The method of preparing the composition involves combining the constituents in an aqueous medium at a pH from 6.5 to 8.0 so as to form a protamine-insulin salt complex, which complex is insoluble and can be separated from the aqueous medium, dried and stored without any deterioration. The dried product is easily reconstituted in a liquid medium.

Other objects of the invention will be apparent from the following description and the appended claims.

FIGS. 1, 2, 3, 4, and 5 are graphs plotting the effects of a variety of insulin preparations in animals after injection, the time being plotted on the abscissa and the bloodsugar level of the injected animal being plotted on the ordinate.

DETAILED DESCRIPTION OF THE INVENTION

Figure 1:
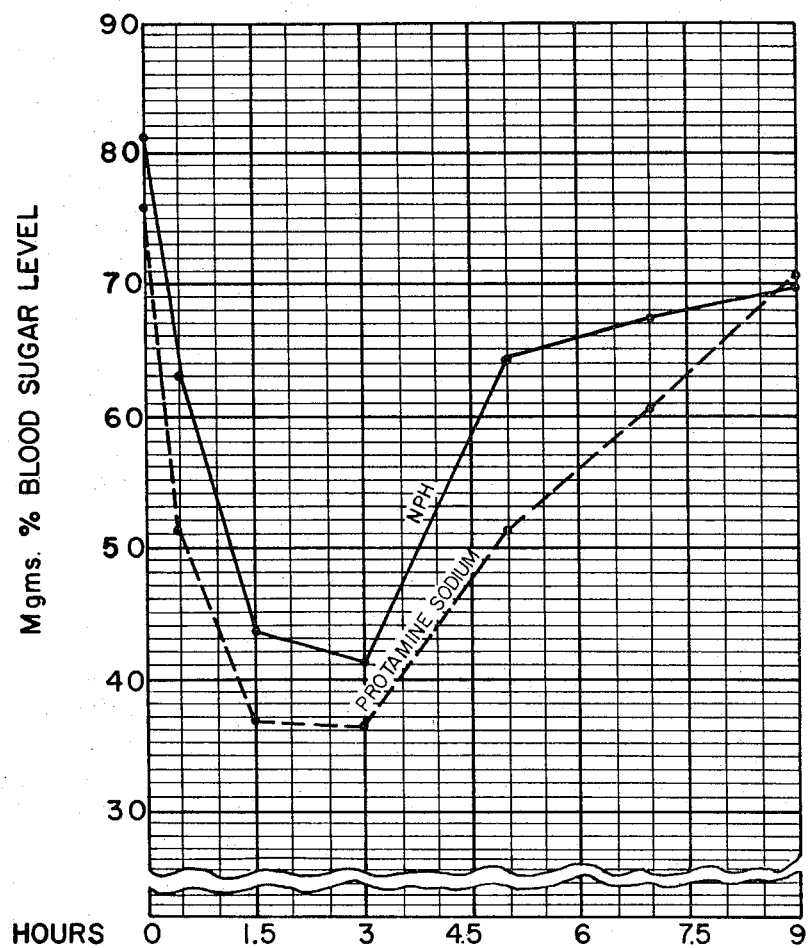
FIG. 1 is a graph comparing the composition of the present invention with isophane insulin injection (NPH).

The invention is directed to a hypoglycemic composition comprising an insulin salt and protamine, which composition effects both a fast onset of action and long lasting action. The insulin salt is in the form of an alkali metal salt or ammonium salt, and the protamine is present as the sulfate in proportions of from about 0.2 mg. to about 1.5 mg., preferably from about 0.4 to about 0.8 mg., for each 100 units of insulin.

The insulin salt, which is substantially free of zinc or other heavy metal, is prepared preferably by alkaline crystallization of the insulin, using sodium hydroxide, an alkali metal hydroxide or ammonium hydroxide. After crystallization, the crystals are washed and dried to a moisture content of less than about 10 percent. The insulin salt is instantly soluble in water at neutral pH and may be stored in solution for as long as 3 months without substantial deterioration.

In the preparation of the compositions of the present invention, the above-described insulin salt and protamine are combined in an aqueous medium in such a manner as to form a complex of the insulin salt and protamine. The aqueous medium is at a pH from about 6.5 to 8.0. The protamine-insulin salt complex may be readily separated by filtration, or like means, from the liquid medium and dried. The complex may be stored in dry form for at least 3 months and longer without deterioration. When it is desired to use the protamine-insulin salt complex, the dried material is reconstituted in an aqueous medium, preferably an isotonic diluent, at a pH from about 6.5 to about 8.0. After reconstitution the complex is ready for injection; the patient receiving the reconstituted preparation obtains both a rapid onset of action and a prolonged duration of hypoglycemic activity.

A typical method for the preparation of the protamine-insulin salt complex comprises preparing the sodium salt of insulin in such a manner that the sodium insulin is substantially zinc-free, i.e., less than about 0.05% zinc. The sodium salt is in crystalline form but is soluble in water or an isotonic diluent. The sodium salt is then dissolved in the liquid medium in a proportion such that there are from 90 units to about 115 units per 100 ml. of liquid medium. Protamine sulfate in the proper amount is then added to the liquid medium. An insoluble complex forms immediately in the form of a very fine precipitate. The finely divided precipitate remains reasonably well suspended in the liquid medium and is adapted to permit easy injection by the user. If the complex is stored in the liquid medium, it remains stable and exhibits no loss of potency for periods of at least 3 months.

If dried protamine-insulin salt complex is reconstituted it is desirable to mix the complex in the liquid to distribute the precipitate in the liquid medium for the purpose of injection.

The exact nature of the association between the insulin salt and the protamine is not known; however, the association is sufficiently strong that the insoluble complex is easily separated from the liquid medium and dried for ease of shipping or very long storage periods. The product in the dry form may be stored for an infinite period of time.

At first it was thought the rapid onset of action observed with the protamine-insulin salt preparation was due to free insulin in the mother liquor; however, analysis has shown that only 0.015 percent of the total insulin activity present in the preparation remains in the soluble form. Thus, it appears that the association of the insulin with the protamine may be quite loose, and hence, the insulin may be readily available for absorption after injection. It also appears that the nature of this complex is different from the known commercial protamine-zinc-insulins wherein the dissociation of the insulin from the complex is much slower in the tissues and no rapid onset of action is observed.

The protamine-insulin salt complex is formed in a liquid medium having a pH from about 6.5 to about 8.0, preferably, from about 7.2 to about 7.6.

The alkali metal salt of insulin for use in the present invention is obtained by subjecting crude insulin to treatment in the presence of alkali metal salt. For reasons of economics and ease of operation sodium hydroxide is preferred as the source of alkali metal ions used for formation of the alkali metal salt of insulin. The sodium salt is prepared by subjecting crude insulin in aqueous solution to treatment with sodium hydroxide, the latter being present in sufficient quantity to afford a pH level of about 8–8.5. The treatment comprises mild agitation of the alkaline solution for at least 15 minutes and preferably for about an hour or more. The sodium insulin salt precipitates in the solution and is easily separated by decanting, centrifuging, filtering or the like. The sodium insulin salt may be purified by subsequently dissolving the salt and reforming the precipitate which in form simulates crystals. Analysis has shown that in the case of the sodium salt of insulin there is present about 1 mole of sodium per mole of insulin. The sodium insulin crystals may be of beef or pork origin and are very soluble in water and isotonic solutions around neutral pH.

Suitable alkali metal or metalloid ions with which the salt of insulin can be prepared include potassium, lithium, cesium, sodium, and ammonium.

The protamine is generally present in the form of protamine sulfate or it may be present in other suitable water soluble forms.

If an isotonic diluent is used as the liquid medium for the protamine sulfate and insulin salt, it is preferred that the diluent contain a preservative. Suitable preservatives include phenol and methyl p-hydroxybenzoate.

The following examples illustrate the present invention:

EXAMPLE 1

This example illustrates the preparation of the protamine-insulin complex in dosage form.

Crystalline beef sodium insulin was prepared as follows:

Insulin was extracted from bovine pancreas with an acidified aqueous alcholic medium, concentrated by vacuum distillation, and partially purified by fractional precipitation with sodium chloride and isoelectric precipitation. The insulin was further purified by an alkaline crystallization at pH 8.2. The resulting crystals were dissolved in dilute acetic acid (0.5N) and further fractionated by gel filtration on Sephadex G-50 (a gel manufactured and sold by Pharmacia Fine Chemicals, Uppsala, Sweden).

The effluent, which was 0.5N acetic acid containing the insulin, was neutralized to pH 8.2 with 1.0N sodium hydroxide and stirred for 1 hour at room temperature. The sodium insulin crystals were then harvested from the crystallization mixture by filtration and washed with 2% sodium chloride solution. The saline-washed crystals were then placed in an excess of absolute alcohol under vigorous agitation, filtered and collected. After a second absolute alcohol wash, the crystals were washed with ether and dried in vacuum.

The resulting crystalline beef sodium insulin had the following characteristics:

| | |
|---|---|
| Potency | 25.08 Units/mg. |
| Nitrogen | 15.82 percent |
| Moisture | 8.0 percent |
| Color Index | 0.005 for 1 percent solution at 340 m$\mu$. |

A portion of the dried sodium insulin in the amount of 3.98 grams was dissolved in 990 ml. pyrogen-free water containing 2.27 grams of liquified phenol and 1.5 ml. of 10% HCl. The pH was then adjusted to 7.4 with 1.7 ml. of 10 % NaOH. Immunoassays conducted in accordance with the standard U.S.P. assay procedure showed an insulin activity of 101.3 units/ml. This solution was subjected to sterile filtration and then filled into vials using 1.0 ml. per vial, and the vials were subjected to freeze-drying under aseptic conditions to yield dried sodium insulin in each vial. The insulin was stored in this form until time for use in tests.

Into each vial was injected a sufficient amount of an isotonic diluent to reconstitute the insulin in an aqueous medium so as to contain 101.3 units insulin/ml. of liquid medium. The isotonic diluent contained 0.4 mg. protamine sulfate/ml., 1.6% glycerin and 0.25% phenol on a weight per volume basis. The pH of the isotonic diluent was 7.4. Upon addition of the isotonic liquid to the dried-sodium insulin in the vial, there was an instantaneous formation of the protamine-sodium insulin complex. This complex was discernible in the vial as a very finely divided precipitate. The precipitate remained sufficiently evenly suspended in the aqueous diluent so that upon withdrawal into an injection syringe, there was a uniform quantity of insulin in each portion withdrawn.

The biological activity of the preparation was determined in rabbits by the following procedure:

Thirty-six rabbits were divided into two equal groups and fasted for 24 hours before the test. Water, as well as food, was withheld during the test. A sample of blood was obtained from the marginal ear vein for the initial blood sugar determination. The control group of rabbits was injected with the predetermined dose of the neutral protamine Hagedorn insulin (NPH). The test group was injected with the protamine-sodium insulin complex (PSI). A single dose in each of the tests was 1.0 unit/rabbit, which was approximately 0.01 cc. of the insulin preparation. The first blood samples were obtained from each rabbit after one-half hour. Subsequent blood samples were taken at 1.5, 3.0, 5.0, 7.0, and 9.0 hours after injection. Each blood sample was analyzed for the blood sugar level and the results were expressed as milligram percent glucose. The average blood sugar concentration at each bleeding time was calculated for both groups.

In the instance wherein a cross-over test was used, the rabbits which had received the control sample were injected with the protamine-sodium insulin complex and vice versa. These tests were run one week after completion of the original tests. The composite results are expressed as an average blood sugar concentration in milligram percent in FIG. 1 and in Table 1 below:

Table 1

| Time, hours | Blood Sugar Level, mg.% | | | | | |
|---|---|---|---|---|---|---|
| | 0 | 0.5 | 1.5 | 3.0 | 5.0 | 7.0 | 9.0 |
| Control (NPH) | 83.8 | 64.9 | 43.3 | 41.3 | 64.6 | 67.4 | 69.8 |
| PSI | 80.1 | 51.1 | 36.9 | 36.1 | 51.1 | 60.6 | 70.9 |

It is noted that the protamine-sodium insulin of the present invention produced a more rapid onset of action and a more prolonged action than the NPH product.

EXAMPLE 2

This example compares the product of the present invention PSI (protamine-sodium insulin) with a mixture of ARI (acid regular insulin) and NPH proportioned in a ratio of 1:1 based on activity. The PSI was prepared as in Example 1, except that the isotonic diluent contained 0.8 mg. of protamine sulfate/ml. The insulin concentration was the same as in Example 1.

Figure 2:
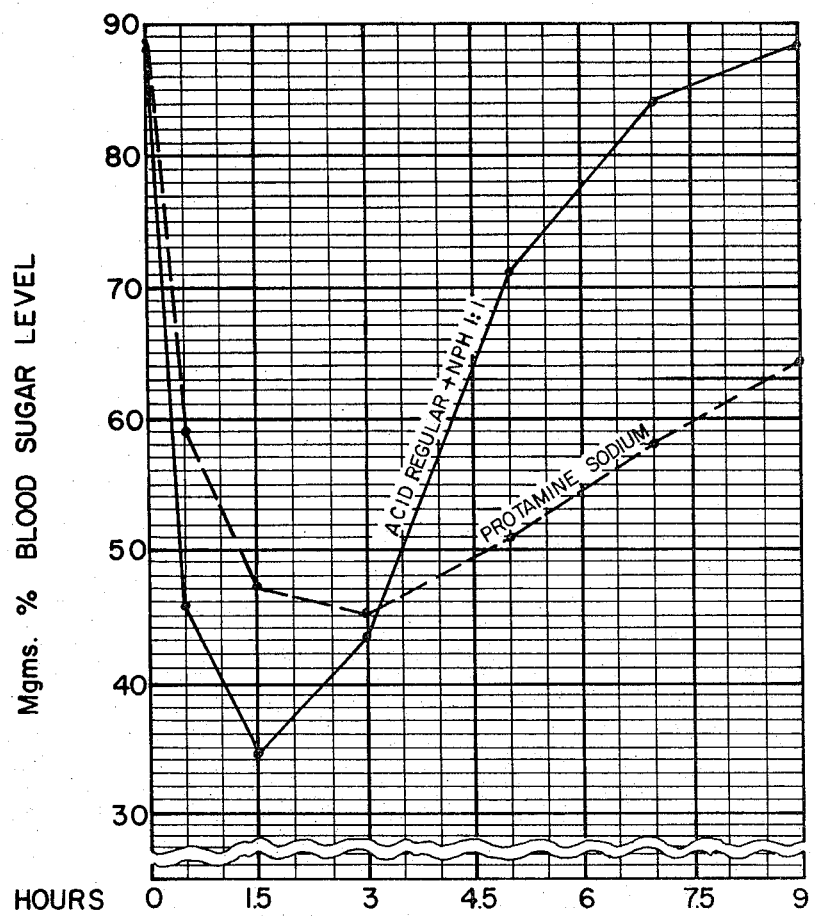
FIG. 2 is a graph comparing the composition of the present invention with a mixture of acid regular insulin and isophane insulin injection.

In this example 36 rabbits were used in crossover tests. Each was injected as in Example 1 with about 0.01 ml. of the insulin product so as to receive 1 unit of insulin per injection. The results are presented in FIG. 2 and in Table 2 below:

Table 2

| Time, hours | Blood Sugar Level, mg.% | | | | | |
|---|---|---|---|---|---|---|
| | 0 | 0.5 | 1.5 | 3.0 | 5.0 | 7.0 | 9.0 |
| ARI & NPH | 88.0 | 45.9 | 34.2 | 43.5 | 71.6 | 84.2 | 88.6 |
| PSI | 87.2 | 59.3 | 47.1 | 45.2 | 51.9 | 58.0 | 64.3 |

The above results illustrate the rapid onset of action produced by the product of the present invention, as well as its long-lasting action.

EXAMPLE 3

This example compares three types of neutral protamine-sodium insulin product in combination with 0.02 mg. of zinc per 100 units of insulin. Each of the insulin products was made by the process of Example 1 except that, as a final step, 0.02 mg. of zinc per 100 units of insulin was added. The purpose of the addition of the zinc was to determine whether or not the zinc would interfere with either the rapid onset or prolonged duration afforded by the protamine-sodium insulin complex. As seen below, no adverse result was observed.

Three products were compared; these were pork insulin, beef insulin, and a mixture containing 75% beef insulin and 25% pork insulin.

Figure 3:
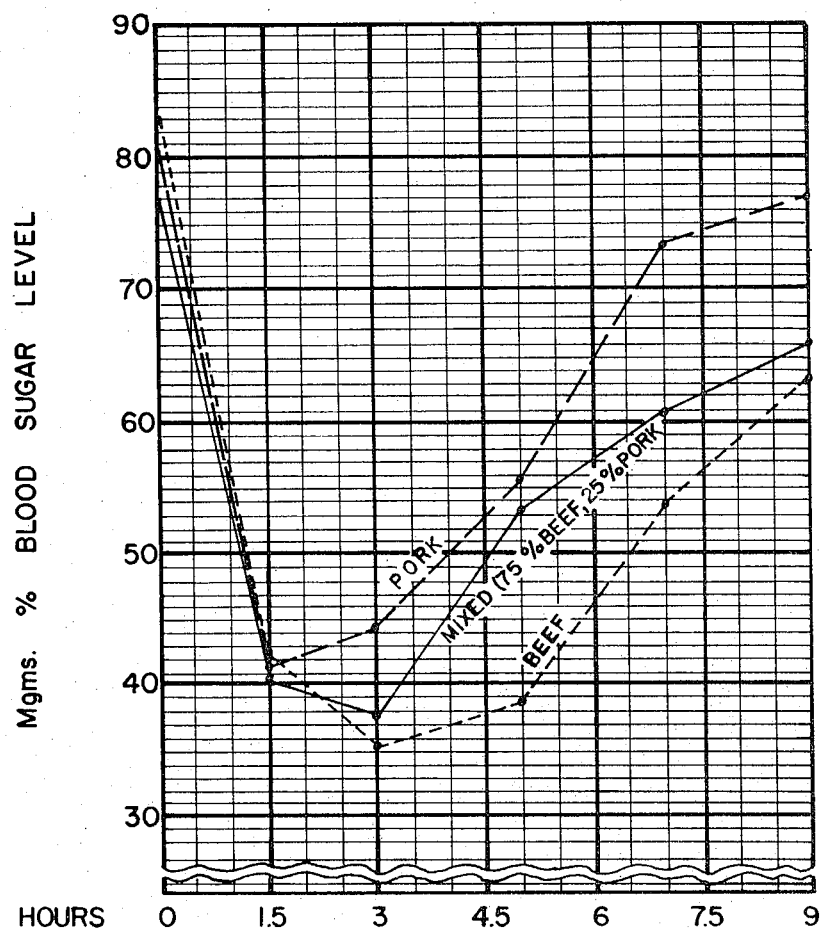
FIG. 3 is a graph which compares three compositions of the present invention, namely, beef insulin, pork insulin, and a mixture of the two.

In this example each test was conducted on six rabbits with a single injection of about 0.01 ml. resulting in an approximate dose of 1 unit of insulin. The results are illustrated in FIG. 3 and presented in Table 3 below:

Table 3

| Time, hours | Blood Sugar Level, mg.% | | | | | |
|---|---|---|---|---|---|---|
| | 0 | 1.5 | 3.0 | 5.0 | 7.0 | 9.0 |
| Pork | 80.3 | 41.5 | 44.5 | 55.4 | 73.0 | 76.7 |
| Mixed | 80.2 | 40.5 | 37.6 | 53.1 | 60.7 | 65.6 |
| Beef | 85.5 | 42.6 | 35.3 | 38.5 | 53.4 | 63.0 |

It should be noted that the results in Table 3 compare favorably with those obtained with the products of Examples 1 and 2. For instance, the pork insulin shows a rapid onset of action, although its duration of action may not be quite as long as the other insulin products; however, the beef and the mixed products yield both a rapid onset and long lasting action.

In addition, it should be noted that a minor amount of zinc was added to the protamine-sodium insulin complex. It has been found that a bivalent metal, such as zinc, should not be present in any substantial quantity, during the formation of the sodium salt of insulin. The purpose of adding the zinc to the protamine-sodium insulin complex was to ascertain whether or not the zinc had any effect on the insulin complex. From the results it may be observed that the zinc did not either interfere with the therapeutic value nor did it add to it.

EXAMPLE 4

This example illustrates the excellent stability of the product of the present invention. The neutral PSI used in this example was prepared according to Example 1, except that the isotonic diluent contained 1.2 mg. of protamine per ml.

Each of the tests was conducted using nine rabbits. The composition, namely, the protamine-sodium insulin complex suspended in the isotonic diluent, was stored at 25°C. in the interval between each of the tests. As before, the rabbits were injected with 0.01 ml. of the insulin product.

Figure 4:
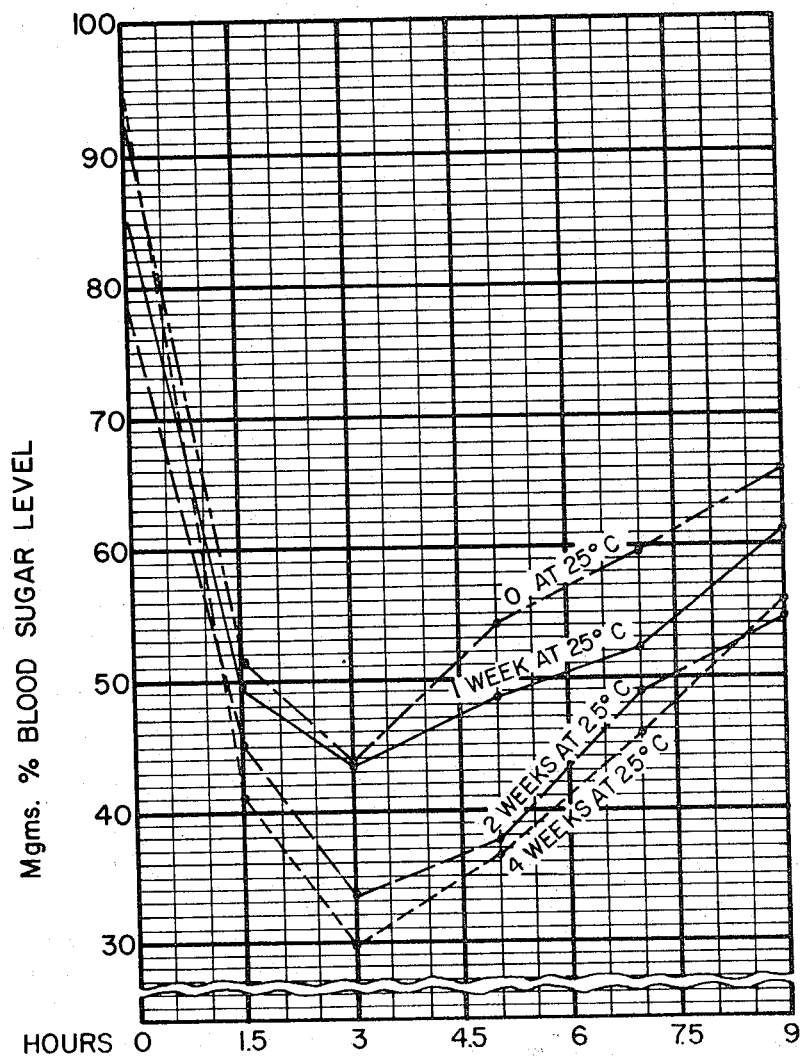
FIG. 4 is a graph comparing the activities of compositions of the invention after storage.

The results are illustrated in FIG. 4. and presented in Table 4 below:

Table 4

| Time, hours | Blood Sugar Level, mg.% | | | | | |
|---|---|---|---|---|---|---|
| | 0 | 1.5 | 3.0 | 5.0 | 7.0 | 9.0 |
| Initially | 91.0 | 51.2 | 43.4 | 54.0 | 59.5 | 65.8 |
| After 1 week | 84.1 | 49.3 | 43.2 | 48.4 | 52.1 | 61.2 |
| After 2 weeks | 78.3 | 45.0 | 33.5 | 37.6 | 48.9 | 54.6 |
| After 4 weeks | 95.3 | 40.9 | 29.8 | 36.6 | 45.7 | 55.8 |

The data in Table 4 clearly show that even after the isotonic solution containing the protamine-sodium insulin complex suspended therein, is stored at 25°C, there is remarkable stability of the insulin activity with respect to retention of both the rapid onset of action and the long lasting action.

EXAMPLE 5

This example illustrates the formation and use of the protamine complex of ammonium insulin, lithium insulin, and potassium insulin, as well as the sodium insulin of Example 1.

Figure 5:
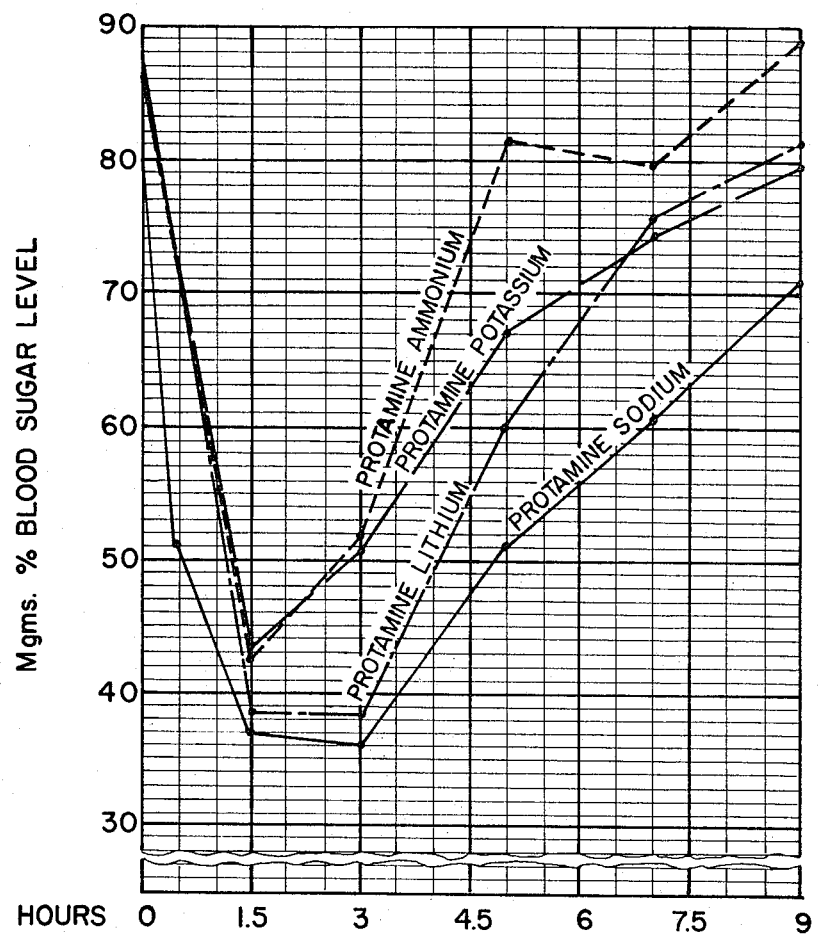
FIG. 5 is a graph comparing exemplary compositions of the present invention.

Each of the above named insulin salts was formed by the procedure of Example 1 mixed with an isotonic solution containing 0.4 mg. protamine sulfate per ml. and injected as in EXample 1 in 18 rabbits. The results are illustrated in FIG. 5 and presented in Table 5 below:

Table 5

| Time, hours | Blood Sugar Level, Mg.% | | | | | |
|---|---|---|---|---|---|---|
| | 0 | 1.5 | 3.0 | 5.0 | 7.0 | 9.0 |
| Ammonium | 86.1 | 42.1 | 51.6 | 81.5 | 79.4 | 88.9 |
| Lithium | 87.1 | 38.6 | 38.6 | 60.2 | 75.9 | 81.1 |
| Potassium | 86.6 | 42.9 | 50.8 | 67.1 | 74.6 | 79.4 |
| Sodium | 80.1 | 36.9 | 36.1 | 51.1 | 60.6 | 70.9 |

Although the sodium insulin presents a longer lasting action, each of the other compositions exhibits a substantial reduction in blood sugar levels.

EXAMPLE 6

This example illustrates the stability of the protamine-sodium insulin complex. The complex was prepared as in Example 1 using 0.4 mg/ml. of protamine sulfate in the isotonic diluent. After preparation of the complex, the complex was placed in several centrifuge tubes. These were then centrifuged and the supernatant liquid was decanted. The separated precipitate was washed with about 15 ml. of absolute alcohol followed by about 15 ml. of ether. The washed precipitate was then vacuum dried at room temperature.

The dried material was resuspended in a neutral isotonic diluent as described before except it did not contain any protamine sulfate. The resuspended material was analyzed for activity and it was found that the activity ranged from 88 to 95 units/ml. showing a slight loss of insulin material experienced in the washing of the protamine-sodium insulin complex prior to drying.

The tests were conducted as before in nine rabbits. The data are presented in Table 6 below: the freeze-dried test was conducted on material which had been resuspended in water and then freeze-dried.

Table 6

| Time, hours | Blood Sugar Level, mg.% | | | | | |
|---|---|---|---|---|---|---|
| | 0 | 0.5 | 1.0 | 3.0 | 5.0 | 7.0 | 9.0 |
| Vacuum dried | 82.0 | 52.5 | 57.3 | 67.8 | 76.7 | 74.3 | 77.3 |
| Freeze dried | 85.4 | 44.7 | 45.6 | 53.1 | 78.9 | 80.7 | 80.0 |

Each of the dried insulin compositions when reconstituted and injected, effected a substantial reduction in blood sugar levels.

I claim:

1. A stable hypoglycemic composition comprising a protamine-insulin salt complex containing from about 0.2 mg. to about 1.5 mg. of protamine for each 100 units of insulin and an insulin salt having less than about 0.05 percent zinc selected from the group consisting of an alkali metal salt of insulin and an ammonium salt of insulin.

2. The composition of claim 1 wherein the insulin salt is the sodium insulin salt.

\* \* \* \* \*